United States Patent

Inoue et al.

[11] Patent Number: 4,746,635
[45] Date of Patent: May 24, 1988

[54] HIGH STRENGTH AND HIGH HARDNESS ALUMINA-ZIRCONIA-SILICON CARBIDE SINTERED CERAMIC COMPOSITE AND ITS MANUFACTURING PROCESS

[75] Inventors: Sigeo Inoue; Tetsuo Uchiyama, both of Kumayaya; Toshio Hirai, Izumi; Koichi Niihara, Yokosuka, all of Japan

[73] Assignees: Kabushiki Kaisha Riken, Tokyo; Toshio Hirai, Izumi; Koichi Niihara, Yokosuka, all of Japan

[21] Appl. No.: 864,353

[22] Filed: May 19, 1986

[30] Foreign Application Priority Data

May 25, 1985 [JP] Japan .................. 60-112744
Feb. 28, 1986 [JP] Japan .................. 61-43519

[51] Int. Cl.$^4$ .................. C04B 35/56; C01B 33/26
[52] U.S. Cl. .................. 501/89; 423/327
[58] Field of Search .................. 501/89; 423/608, 625, 423/327

[56] References Cited

U.S. PATENT DOCUMENTS

| | | | |
|---|---|---|---|
| 4,039,344 | 8/1977 | Nishikawa et al. | 501/89 |
| 4,218,253 | 8/1980 | Dworak | 501/87 |
| 4,543,345 | 9/1985 | Wei . | |

FOREIGN PATENT DOCUMENTS

| | | | |
|---|---|---|---|
| 0047803 | 4/1977 | Japan | 501/89 |
| 0196764 | 12/1982 | Japan | 501/89 |
| 0095658 | 6/1983 | Japan | 501/89 |
| 0026982 | 2/1984 | Japan | 501/89 |
| 0005074 | 1/1985 | Japan | 501/89 |
| 0264357 | 12/1985 | Japan | 501/89 |

OTHER PUBLICATIONS

Becher et al. Communications of the American Ceramic Society, Dec. 1984, pp. C-267 to C-269.

Primary Examiner—William R. Dixon, Jr.
Assistant Examiner—James M. Hunter, Jr.
Attorney, Agent, or Firm—Armstrong, Nikaido, Marmelstein & Kubovcik

[57] ABSTRACT

An alumina-zirconia-silicon carbide sintered ceramic composite having high strength and high hardness is composed of 5 to 50 volume percent of partially stabilized zirconia powder of mean particle size between 0.1 and 1.0 μm, 3 to 40 volume percent of silicon carbide powder of mean particle size smaller than 1 μm or silicon carbide whiskers of 1 μm or less in diameter with an aspect ratio between 3 and 200 or combination of said silicon carbide powder and said silicon carbide whiskers, the balance being substantially alumina powder, wherein zirconia plus silicon carbide accounts for 55 volume percent at most of the total.

The sintered ceramic composite is manufactured by making a mixed powder composed of 5 to 50 volume percent of partially stabilized zirconia powder of mean particle size between 0.1 and 1.0 μm, 3 to 40 volume percent of silicon carbide powder of mean particle size smaller than 1 μm or silicon carbide whiskers of 1 μm or less in diameter with an aspect ratio between 3 and 200 or combination of said silicon carbide powder, and said silicon carbide whiskers, the balance being substantially alumina powder, wherein zirconia plus silicon carbide accounts for 55 volume percent at most of the total, and then sintering the molded mixed powder at a temperature between 1400° and 1800° C.

Further, the mixed powder to be molded and sintered is made on a ball mill equipped with a pot made of one or more of the ceramic materials of which such sintered ceramic is composed.

11 Claims, 4 Drawing Sheets

HIGH STRENGTH AND HIGH HARDNESS ALUMINA-ZIRCONIA-SILICON CARBIDE SINTERED CERAMIC COMPOSITE AND ITS MANUFACTURING PROCESS

BACKGROUND OF THE INVENTION

1. Field of the Invention

The present invention relates to a high strength and high hardness alumina-zirconia-silicon carbide sintered ceramic composite and its manufacturing process.

2. Description of the Invention

Among other kinds of ceramics, alumina ceramics have been used in a variety of applications, for example, IC substrates, packages, cutting tools, etc.

On the other hand, in recent years there have been attempts to incorporate, partially stabilized zirconia into alumina, silicon carbide, silicon nitride, or other ceramic materials so that the sintered ceramic composites retain the high temperature tetragonal phase of zirconia at room temperature below the unconstrained transformation temperature. In these attempts, it was expected that the residual compressive stress due to a 4% volume increase accompanied by stress induced transformation of zirconia from the metastable tetragonal phase to the stable monoclinic phase within the near vicinity of the crack tip would suppress primary crack extension and improve fracture toughness. In ceramic materials, an increase of toughness provides high mechanical performance.

Compared to other ceramic materials, however, since zirconia has a relatively low hardness of about 1200 kg/mm$^2$, the zirconia-modified ceramic material, though it is satisfactory in mechanical strength, has a drawback in that its hardness is lowered. For ceramics for which high hardness is another important requirement, for example, for cutting tools, therefore, only a limited amount of zirconia can be added. Development of alumina-based ceramics that are characterized both by high mechanical strength and high hardness are thus needed.

OBJECTS AND SUMMARY OF THE INVENTION

Accordingly, it is an object of present invention to provide an alumina-based sintered ceramic that is characterized both by high mechanical strength and high hardness, together with its manufacturing process.

It is another object of invention to provide a manufacturing process of the above ceramic whose mechanical strength is further increased by reducing the number of fracture origins present therein to a trace.

Namely, the invention pertains to a high strength and high hardness alumina-zirconia-silicon carbide sintered ceramic composite consisting essentially of 5 to 50, volume percent of partially stabilized zirconia of mean particle size 0.1 to 1.0 μm, 3 to 40 volume percent of silicon carbide powder of mean particle size smaller than 1 μm or silicon carbide whiskers of diameter smaller than 1 μm and aspect ratio of 3 to 200 or combination of the above silicon carbide powder and whiskers, and the balance substantially composed of alumina powder, wherein the sum of the above silicon carbide plus the above zirconia accounts for 55 volume percent at most of the total.

The invention also refers to a manufacturing process of the above sintered ceramic composite wherein a mixed powder that comprises 5 to 50 volume percent of partially stabilized zirconia of mean particle size 0.1 to 1.0 μm, 3 to 40 volume percent of silicon carbide powder of mean particle size smaller than 1 μm or silicon carbide whiskers of diameter smaller than 1 μm and aspect ratio of 3 to 200 or combination of the above silicon carbide powder and whiskers, the balance substantially comprising alumina powder wherein the above silicon carbide plus the above zirconia account for 55 volume percent at most of the total is molded and sintered at a temperature between 1400° C. and 1800° C.

DESCRIPTION OF THE PREFERRED EMBODIMENTS

Figure 1:
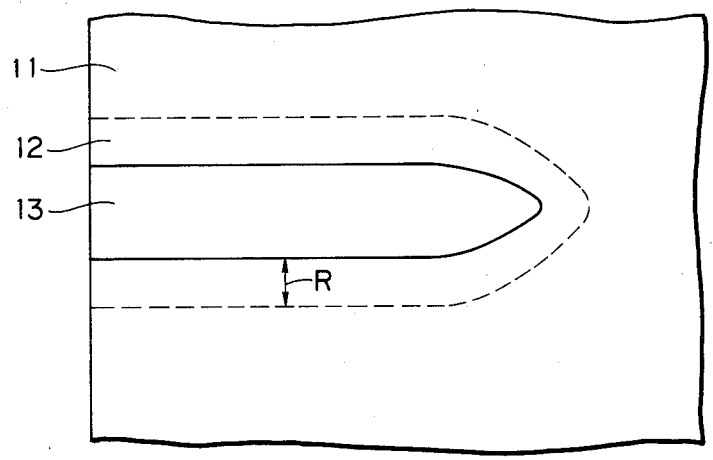
FIG. 1 is a sketch that schematically illustrates in cross section a crack and surrounding transformation zone formed in sintered ceramic materials embodying the invention.

The mechanical strength of brittle materials such as ceramics can be increased by improving their toughness and/or reducing the size of defects that are fracture origins. In recent years, as approaches to toughen ceramics, for example, transformation toughening making use of zirconia, toughening making use of interactions between the crack tip and the second phase (for example, crack deflection), etc. have been tested. However, the factor which determines the extent of the transformation zone at the crack tip that is involved in transformation toughening has not been elucidated. Further, it has not been determined whether crack deflection, which constitutes a second important toughening mechanism next to transformation toughening can be effected without detriment to the transformation toughening.

As a result of present inventors' strenuous studies, the present inventors found that a multiple toughening approach that combines transformation toughening and crack deflection gives alumina-based ceramics that are characterized by high mechanical strength and high hardness.

In the present invention, silicon carbide and partially stabilized zirconia (to which a stabilizer, such as yttria, magnesia, calcia, or the like, is added) are uniformly dispersed in an alumina matrix to achieve the following effects in addition to the strengthening due to transformation toughening resulting from addition of partially stabilized zirconia:

(i) A lowering in hardness due to addition of the above zirconia is compensated by adding silicon carbide that increases hardness.

(ii) Dispersion of silicon carbide, and particularly, silicon carbide whiskers in the matrix causes a crack deflection effect that results in further toughening and higher mechanical strength.

(iii) Due to an extension of the transformation zone under the effect of the above factor (ii), and to an increase in the Young's modulus, more transformation toughening is achieved giving higher mechanical strength.

With regard to the effect (i), a sintered ceramic composite which is a brittle material has a hardness H approximated by the following mixing rule:

$$H = \gamma_{Al_2O_3} \cdot V_{Al_2O_3} \cdot H_{Al_2O_3} + \gamma_{SiC} \cdot V_{SiC} \cdot H_{SiC} + \gamma_{ZrO_2} \cdot V_{ZrO_2} \cdot H_{ZrO_2} \qquad (1)$$

wherein $\gamma_{Al_2O_3}$, $\gamma_{SiC}$, and $\gamma_{ZrO_2}$ are the geometrical constants that are determined by the spatial distribution of individual components, $V_{Al_2O_3}$, $V_{SiC}$, and $V_{ZrO_2}$ are volume fractions of individual components, and $H_{Al_2O_3}$, $H_{SiC}$, and $H_{ZrO_2}$ represent the hardness of individual components.

$H_{Al_2O_3}$, $H_{SiC}$ and $H_{ZrO_2}$ are about 2000 kg/mm², 2500–3500 kg/mm², and about 1200 kg/mm², respectively. Zirconia is thus about half as hard as alumina. Therefore, addition of zirconia means lowering in hardness. On the one hand, silicon carbide is one of those commercially available ceramic materials that have very high hardness. By adding silicon carbide, therefore, lowering in the hardness that is caused by addition of zirconia can be compensated.

The effect (ii), namely, the crack deflection occurs as the propagating crack interacts with the second phase. The interactions involving crack tilting and twisting introduce non-planar fracture surface, thus increasing the energy dissipated for crack propagation.

The following basic requirements must be satisfied to have the above effect work effectively:

(a) The matrix and obstacle phase are bonded to each other at their interface so weakly that as a crack reaches such interface the crack is deflected. Whether this requirement is satisfied or not depends both on the chemical and mechanical bonding conditions between the matrix and obstacle phase.

(b) The obstacle phase has a mechanical strength satisfactorily higher than that of the matrix and presents a suitable dispersion condition in the matrix. Further, for the shape of such phase, the higher the aspect ratio, the better the effect.

By the incorporation of silicon carbide, and particularly silicon carbide whiskers into alumina matrix, the above requirements (a) and (b) can both be satisfied.

The effect (iii) that results from the extension of the transformation zone can be described as follows.

Generally, a sintered ceramic composite that is endowed with the transformation toughening mechanism is characterized by fracture toughness as expressed by the following expression:

$$K_\gamma = [Km^2 + 2EcR(\Delta U - Vp \cdot \Delta Go)f]^{\frac{1}{2}} \qquad (2)$$

wherein $K\gamma$ and $km$ represent the fracture toughness of the sintered ceramic composite and matrix, repectively, Ec the Young's modulus, R the width of the transformation zone, $\Delta U$ the increase in the strain energy caused by the phase transformation, Vp the volume fraction of zirconia in the transformation zone, $\Delta Go$ the Gibbs' free energy necessary for phase transformation, and f the number of zirconia particles per unit volume.

The above transformation zone is schematically illustrated in FIG. 1. There, the matrix 11 where tetragonal phases of partially stabilized zirconia are dispersed has a propagating crack 13 and a transformation zone 12 with a width R where such zirconia has transformed from the tetragonal to phase monoclinic phase. As the above transformation occurs in the transformation zone 12 and its volume increases, a compressive stress is generated there to squeeze the crack 13 so its further propagation is suppressed. This gives a higher fracture toughness. In Equation 2, if the kind and content of stabilizer used in zirconia, mixing ratio of zirconia, and particle sizes of raw material powder used are given, $\Delta U$, Vp, $\Delta Go$ and f are determined, so the increase in fracture toughness given by the transformation toughening mechanism is enlarged with the width R of transformation zone 12 and Young's modulus Ec.

Although there is yet no quantitative understanding of the factor which determines the parameter R, it can be predicted that if a large stress is generated around the crack, the transformation zone will necessarily widen to increase R.

Since the stress generated around the crack is related to Km, R can be expressed in the following form:

$$R = g(Km) \qquad (3)$$

where a monotonous increasing function can be assumed for g(Km).

Incorporation of silicon carbide, and particularly silicon carbide whiskers results in an increase in the value of Km under the effect of crack deflection as already mentioned, thereby also increasing the parameter R. Incorporation of silicon carbide increases the value of Ec since this compound has a high Young's modulus of about $4.5 \times 10^4$ kg/mm².

As mentioned above, incorporation of silicon carbide, and particularly silicon carbide whiskers increases both R and Ec in Equation (2), contributing much to augmentation of the effect of transformation toughening and also increases Km to improve the fracture toughness the ceramic composite. These are the mechanisms responsible for the increase in mechanical strength.

In the manufacture of high strength and high hardness alumina-based sintered ceramic composites, as already mentioned, incorporation of zirconia has a drawback because it lowers the hardness, though it serves the purpose of increasing the mechanical strength. To compensate the lowering in for the hardness that results from incorporation of zirconia, and at the same time further multiply the increase in mechanical strength attained by such incorporation of zirconia, and also from the viewpoint of commercial availability, silicon carbide whisker is a very preferable material. This is because such whisker contributes to the two toughening mechanisms for increasing mechanical strength, one capable of increasing the fracture toughness Km of the matrix through the crack deflection toughening mechanism and the other capable of increasing R (through the crack deflection) and Ec for more transformation toughening.

The basic concept of the invention has been mentioned above. Next, concrete conditions to embody the invention will be mentioned.

Alumina has several crystalline forms; $\alpha$, $\gamma$, etc. For structural ceramics, the $\alpha$ form of alumina is generally used for the raw material powder. Being porous, the $\gamma$ form is used as a catalyst carrier. In the present invention, both the $\alpha$ and $\gamma$ forms of alumina may be used. From the viewpoint of good sintering performances and higher mechanical strength that can be achieved by finer grains of alumina matrix, an $\alpha$-form alumina powder whose mean particle size is smaller than 1 μm is preferable. Further, a powder of an aluminium salt that can be converted to alumina, for example, aluminium hydroxide or aluminium sulfate may be used for the raw material. In any case, purity of at least 98% is preferable.

Partially stabilized zirconia powder having a mean particle size is smaller than 0.1 μm too stabilized to undergo stress-induced transformation, while a mean particle size larger than 1.0 μm makes the powder so unstable that transformation from the tetragonal to the monoclinic phase occurs without any stress. In both cases, therefore, no improvement in mechanical strength is expected. For the above reasons, the mean particle size of zirconia is selected to be between 0.1 and 1.0 μm. The preferable particle size distribution is the one that has a sharp peak of narrow width. Particularly, zirconia powder more than 45 volume percent of which is accounted for by particles sized between 0.15 and 0.3 μm is more preferable. If zirconia is added in less than 5 volume percent, the effect of transformation toughening will not be noticeable. If the added amount of zirconia exceeds 50 volume percent, however, lowering in hardness can no more be compensated by addition of silicon carbide. Zirconia is thus added in an amount between 5 and 50 volume percent. As a stabilizer for the zirconia, about 2 mol percent (about 3.5 weight percent) of yttria is preferable.

On the other hand, the mean particle size of silicon carbide powder is preferably smaller than 1 μm since larger grains behave as defects and thus lower the mechanical strength. In case silicon carbide whisker is used, a preferable aspect ratio is lower than 200. This is because whiskers with an aspect ratio higher than 200 are too long, rather suppressing crack deflection and thus reducing the toughening effect. The preferable diameter of these whiskers is 1 μm or less, for silicon carbide whiskers thicker than 1 μm will behave as defects lowering the mechanical strength. In addition, the silicon carbide used must be pure enough to avoid formation of reaction products between impurities and main components. Silicon carbide whose purity is higher than 98% is thus preferable. In order that silicon carbide may exert the aforementioned effects, silicon carbide must be added in an amount higher than 3 volume percent. On the other hand, if the content of silicon carbide exceeds 40 volume percent, the mechanical strength of composite will be rather lowered. Therefore, the preferable content of silicon carbide is 3 to 40 volume percent.

It is noted that the above zirconia and silicon carbide should be added in such amounts that their total content is less than 55 volume percent. Above 55 volume percent, the mechanical strength and/or hardness will be lowered because of superfluous silicon carbide and/or zirconia.

When the above ceramic raw materials are mixed, use of a mixing pot that is in effect composed of one or more of these raw materials will give particularly favourable results. For example, an alumina pot, zirconia pot, or silicon carbide pot is used. As the balls used for milling, those composed of alumina, zirconia and/or silicon carbide are preferable.

As a mixing medium, in addition to methyl alcohol and ethyl alcohol, an inorganic liquid such as distilled water is also usable.

For mixing, a 1 liter pot is charged with 200 g in total of raw ceramic materials, 500 ml of mixing medium, and 50 balls of 20 mm in size. If the pot has a different capacity, it is only necessary to change the above amounts in proportion to such capacity.

Mixing is carried out for more than 10 hrs. With a mixing time shorter than 10 hrs, the alumina, zirconia and silicon carbide and or silicon carbide whiskers will not be uniformly dispersed.

For molding and sintering, though as in ordinary powder metallurgy a mixed powder may be molded at room temperature and sintered at atmospheric pressure, use of a hot press will produce sintered ceramic endowed with superior mechanical properties. The sintering temperature is preferably in a range from 1400° to 1800° C. because ceramic composites sintered at a temperature lower than 1400° C. fail to achieve a sufficiently high density while at a temperature higher than 1800° C., crystal grains of the alumina matrix become coarser and partially stabilized zirconia grains grow to lose stability, resulting in a lowered mechanical strength. The particularly preferable range of sintering temperature is from 1450° to 1750° C.

In a sintering process under atmospheric pressure, a temperature higher than 1700° C. is preferable to achieve a density high enough to provide high mechanical strength and high hardness. If a hot press is used, however, a comparatively low sintering temperature even below 1700° C. will still provide a sufficiently high density. The gas atmosphere for the sintering process may be nitrogen gas, argon gas, reducing gas, vacuum, etc. It is noted however that at a sintering temperature above 1700° C. zirconia reacts with nitrogen. At such high temperature, therefore, a gas other than nitrogen, particularly argon gas is preferable.

Defects that exist in the sintered ceramic affect its mechanical strength in the following manner.

Generally, the mechanical strength $\sigma_f$ of ceramic materials is expressed by the following expression, $$\sigma_f \approx K_{IC}/Y\sqrt{a} \qquad (4)$$

where in $K_{IC}$ is the fracture toughness and is a parameter that is determined by the design of ceramic materials, a is the size of a defect that causes an unstable fast fracture, y is a constant determined by the configuration of a defect.

It is understood therefore that once the ceramic materials are selected, an improvement of the sintering process which gives a smaller value of a in the above expression will directly lead to an improvement in mechanical strength.

Generally, the parameter refers to the maximum defect size in a region where the maximum stress is applied in the strength tests (tensile, bending and other tests). There are various possible factors increasing the value of a; involvement of an inclusion, microcracks that appear at the coarse grain boundaries, larger pores that are formed with gas generation, pores resulting from incomplete sintering, etc. In the manufacture of sintered ceramics, therefore, it is necessary to establish and control the process to eliminate these processing related defects.

After many studies, the present inventors made the findings mentioned below, which led to completion of the present invention.

In the prior art, to manufacture alumina-zirconia-silicon carbide sintered ceramic composites, alumina, silicon carbide and zirconia powders are mixed in a plastic pot with alumina balls, using ethyl alcohol as the mixing medium. Accordingly, as shown by an analysis, some plastic resin comes off the plastic pot to contaminate the mixed powder. Further, there is a sufficient possibility that some ethyl alcohol may be left in the mixed powder. These impurities decompose later in the sintering process to generate free carbon, which reacts with silicon dioxide ($SiO_2$) with which the surface of silicon carbide particles are thinly coated at temperatures (1350° to 1800° C.) around the sintering temperature, producing carbon monoxide (CO) gas according to the following formula (5):

$$C + O \text{ (in } SiO_2) \rightarrow CO \text{ (gas)} \quad (5)$$

This gas forms pores in the sintered ceramic composite. Water vapor that is formed from the water content of ethyl alcohol is another cause of pore formation. In this case, the size of the defect related to pores formed by gas generation determines the mechanical strength of ceramic materials. To manufacture high strength sintered ceramic, therefore, it is necessary to suppress the reaction as expressed by the equation (5).

To suppress the reaction (5), the following possibilities may be considered:

(i) To avoid contamination of the mixed powder with plastic resin that is the source of free carbon;

(ii) To eliminate the thin $SiO_2$ film from the surface of silicon carbide particles; and (iii) To remove ethyl alcohol entirely.

With respect to the second possibility (ii), it is impossible to remove the thin $SiO_2$ film completely although with commercially available silicon carbide whiskers the manufacturing process can be so designed that the formation of $SiO_2$ film may be minimized, for example, by treatment with hydrofluoric acid (HF).

If the first possibility (i) is resorted to, namely, if contamination of the mixed powder with plastic resin is avoided, sintered ceramics of high mechanical strength can be manufactured. For this purpose, for example, a high strength alumina pot may be used. Then, even if alumina comes off the pot due to its wear and is mixed with the ceramic powder, there is no problem since such alumina is one of the raw materials that are being mixed. Generation of free carbon is thus fully avoided.

The third possibility (iii) can be achieved by full drying of the mixed powder prepared. To positively remove ethyl alcohol, it is preferable to maintain the mixed powder in a temperature range from 400° to 1000° C. (for example, at a temperature higher than 500° C.) under evacuation before the mixed powder is fully sintered.

To further illustrate this invention, and not by way of limitation, the following examples are given.

EXAMPLE 1

Either an α-form alumina powder of mean particle size smaller than 1 μm and purity 98% or over or Δ-form alumina powder of mean particle size the 2 to 4 μm and purity of 98% or over, partially stabilized zirconia of mean particle size 0.47 μm containing 2 mol percent (3.5 weight percent) of yttria, and silicon carbide whiskers of diameter 0.2 μm and aspect ratio of 10 to 50 were mixed in the proportions given in Table 1 and mixed for 24 hr in a wet process, making use of ethyl alcohol as a mixing liquid in a ball mill comprising a plastic pot and alumina balls.

TABLE 1

| $Al_2O_3$ Mean Particle size, μm | Volume % | $ZrO_2$ Volume % | SiC whisker Volume % | Sintering temp. °C. | Bending strength kg/mm² | Hardness HV kg/mm² | Note |
|---|---|---|---|---|---|---|---|
| 0.76 α-form | 70 | 15 | 15 | 1650 | x̄: 77.4 σ: 18.0 n: 10 | x̄: 1729 σ: 29.8 n: 12 | Samples sintered under atmospheric pressure |
| 2.13 γ-form | 70 | 15 | 15 | 1650 | x̄: 78.0 σ: 12.2 n: 10 | x̄: 1733 σ: 43.0 n: 16 | Samples sintered under atmospheric pressure |
| 0.76 α-form | 70 | 15 | 15 | 1600 | x̄: 116.3 σ: 8.4 n: 8 | x̄: 1739 σ: 19.4 n: 16 | Samples sintered on hot press |
| 0.92 α-form | 75 | 15 | 10 | 1500 | x̄: 105.5 σ: 12.6 n: 8 | x̄: 1729 σ: 59.5 n: 12 | Samples sintered on hot press |
| 2.13 γ-form | 70 | 15 | 15 | 1450 | x̄: 126.5 σ: 10.5 n: 8 | x̄: 1750 σ: 39.1 n: 16 | Samples sintered on hot press |
| 0.92 α-form | 70 | 15 | 15 | 1350 | x̄: 52.0 σ: 15.4 n: 8 | x̄: 1350 σ: 30.5 n: 12 | Comparative example 1 hot press |
| 0.92 α-form | 70 | 15 | 15 | 1850 | x̄: 72,9 σ: 18.0 n: 8 | x: 1750 σ: 20.5 n: 12 | Comparative example 2, hot press |
|  | 0 | 100 | 0 | 1450 | x̄: 98.4 σ: 10.2 n: 10 | x̄: 1248 σ: 22,9 n: 6 | Comparative example 3, |
| 76 α-form | 85 | 15 | 0 | 1500 | x̄: 64.8 σ: 8.4 n: 10 | x̄: 1590 σ: 48 n: 10 | Comparative example 4, |

The mixed powders thus prepared were dried and a partial volume of each was molded to a block of approximately 20×50×15 mm under a rubber press and sintered for 3 hr at 1600° to 1650° C. in nitrogen gas stream and under atmospheric pressure. The remaining part of each mixed powder was hot pressed into 5.5 mm thick discs sized of 50 mm in diameter in a graphite mold under nitrogen gas stream. On the hot press, a pressure of 300 kg/mm² was applied for 1 hr at a temperature between 1450° and 1600° C.

Using a diamond blade and diamond grinding wheel, test specimens sized 3×4×36 mm for the bending test and test specimens sized 4×10×10 mm for the hardness measurements were cut and ground from the sintered samples. The surfaces of these test specimens were polished to a mirror surface condition using a diamond polishing fluid. For the bending test, the 3-point test set-up was used with a distance for 30 mm between supporting points and a cross head speed of 0.5 mm/min, while hardness was measured on a Vickers' hardness tester.

Table 1 gives the test results. In this table, $\overline{X}$, $\sigma$, and n represent the mean value, standard deviation, and number of measurements, respectively.

For comparison, similar tests were repeated with two sintered samples, one hot pressed at 1350° C. (comparative example 1) and the other at 1850° C. (comparative example 2), a sintered sample prepared by the same method except that zirconia powder alone (containing 3 mol percent $Y_2O_3$) was used (comparative example 3), and a sintered sample prepared by the same method except that no silicon carbide whiskers were used (comparative example 4). The results are also included in Table 1.

In the table, when compared to the comparative example 3, which is a sintered sample of the prior art, the sintered samples prepared according to the invention were equivalent in the bending strength but were about 500 kg/mm² higher in estimated Vickers' hardness. Further, when compared to comparative example 4, which is another sintered sample of the prior art, the sintered samples of the invention had higher estimates both for bending strength and Vickers' hardness. The comparative example 1 that was hot pressed at 1350° C. was not sintered fully, so this comparative example could not achieve a satisfactorily high density. As a result, the comparative example 1 had lower estimates both for the bending strength and hardness. Further, the comparative example 2 that was hot pressed at 1850° C. showed a clear lowering in the bending strength because of the presence of coarser grains of alumina matrix and also less stabilization of partially stabilized zirconia grains through its growth that resulted in an unsatisfactory toughening effect. It can understood from the above results that alumina-based sintered ceramics prepared according to the present invention are ceramics of high mechanical strength which are superior in hardness.

EXAMPLE 2

Tests similar to the Example 1 were made using argon for gas atmosphere as the sintering. It is noted, however, that in this case silicon carbide whiskers were replaced with silicon carbide powder for some test samples and when atmospheric pressure was used for sintering, the sintering temperature was set between 1700° and 1750° C. Table 2 shows the test results.

TABLE 2

| $Al_2O_3$ Mean particle size μm | Volume % | $ZrO_2$ Volume % | SiC Volume % | Sintering temp. °C. | Bending strength kg/mm² | Hardness HV Kg/mm² | Note |
| --- | --- | --- | --- | --- | --- | --- | --- |
| 0.76 α-form | 80 | 15 | 5 (powder) | 1700 | $\bar{x}$: 75.3 $\sigma$: 15.2 n: 10 | $\bar{x}$: 1620 $\sigma$: 45.2 n: 12 | Sample sintered under atmospheric pressure |
| 0.76 α-form | 70 | 15 | 15 (whiskers) | 1740 | $\bar{x}$: 82.4 $\sigma$: 10.3 n: 10 | $\bar{x}$: 1738 $\sigma$: 27.6 n: 12 | Sample sintered under atmospheric pressure |
| 0.05 γ-form | 70 | 15 | 15 (whiskers) | 1740 | $\bar{x}$: 84.8 $\sigma$: 14.2 n: 10 | $\bar{x}$: 1740 $\sigma$: 38.8 n: 16 | Sample sintered on under atmospheric pressure |
| 0.76 α-form | 70 | 15 | 15 (whiskers) | 1600 | $\bar{x}$: 115.9 $\sigma$: 8.4 n: 8 | $\bar{x}$: 1738 $\sigma$: 18.0 n: 16 | Sample sintered on hot press |
| 0.92 α-form | 75 | 15 | 10 (powder) | 1500 | $\bar{x}$: 105.8 $\sigma$: 12.7 n: 8 | $\bar{x}$: 1731 $\sigma$: 56.3 n: 12 | Sample sintered on hot press |
| 0.05 γ-form | 70 | 15 | 15 (whiskers) | 1450 | $\bar{x}$: 126.9 $\sigma$: 11.5 n: 8 | $\bar{x}$: 1755 $\sigma$: 38.0 n: 16 | Sample sintered hot press |
| 0.92 α-form | 70 | 15 | 15 (whiskers) | 1350 | $\bar{x}$: 52.3 $\sigma$: 10.9 n: 8 | $\bar{x}$: 1355 $\sigma$: 36.1 n: 12 | Comparative example 1, hot press |
| 0.92 α-form | 70 | 15 | 15 (whiskers) | 1850 | $\bar{x}$: 71.3 $\sigma$: 18.0 n: 8 | $\bar{x}$: 1746 $\sigma$: 23.0 n: 12 | Comparative example 2, hot press |
|  | 0 | 100 | 0 | 1450 | $\bar{x}$: 95.8 $\sigma$: 10.6 n: 10 | $\bar{x}$: 1239 $\sigma$: 20.2 n: 6 | Comparative example 3 |
| 76 α-form | 85 | 15 | 0 | 1500 | $\bar{x}$: 63.0 $\sigma$: 7.9 n: 10 | $\bar{x}$: 1585 $\sigma$: 53 n: 10 | Comparative example 4 |

For the sintering process under atmospheric pressure, use of argon as the gas atmosphere allowed an increase in the sintering temperature as compared to Example 1. The result was more completely sintered samples with higher estimated bending strength as compared with Example 1.

In case a hot press was used for sintering, there was no obvious difference between Examples 1 and 2 regardless of the test samples or comparative examples.

EXAMPLE 3

Alumina powder, silicon carbide whiskers and partially stabilized zirconia were mixed to account for 70, 15, and 15 volume percent, respectively, of the mixture. For the above, there were used alumina powder of the γ-crystalline form having a purity higher than 99% and a specific surface area of 68 m²/g, silicon carbide whiskers of the β-crystalline form characterized by diameters from 0.1 to 1.5 μm, lengths from 20 to 200 μm, aspect ratios from 20 to 200 and purity above 98%, and partially stabilized zirconia powder composed of 47% tetragonal form and 53% monoclinic form, stabilized with addition of 2 mole percent of yttria, and having a specific surface area of 15 m²/g. Further, magnesia was added as a sintering aid in an amount of 0.25 weight percent of the mixture.

A 2 liter alumina pot was charged with the above mixture, 1000 ml of ethyl alcohol, and 100 alumina balls of 20 mm in diameter for 40 hr wet mixing. The mixed powder was dried 20 min in a microwave oven and its sample was analyzed for the carbon content. The dried powder was further subjected to dry mixing. Sample 1 was thus prepared.

Beside the above, a 1 liter plastic pot was charged with the same ceramic raw materials, 500 ml of ethyl alcohol, and 50 alumina balls of 20 mm in diameter. 15, 30 and 50 hr after the start of mixing, sampling was made for carbon analysis (Samples 2, 3 and 4).

Table 3 shows the carbon analyses made with the above samples.

It is noted that the carbon content data given in Table 3 do not contain the carbon of silicon carbide. Namely, the analysis of Sample 1 gave 3.39 wt% for the estimate of total carbon content, which well coincided with the carbon content calculated from the silicon carbide content of the formulation. Carbon content data for Samples 1, 2, 3, and 4 were estimated by subtracting the above value 3.39wt% from the total carbon content determined by analyses.

TABLE 3

| Sample No. | Pot (mixing time) | C (wt %) |
|---|---|---|
| 1 | Alumina (40 hr) | 0 |
| 2 | Plastic (15 hr) | 0.12 |
| 3 | Plastic (30 hr) | 0.06 |
| 4 | Plastic (50 hr) | 0.35 |

With all Samples 2, 3 and 4, contamination of the mixed power with fine plastic powder was confirmed. In the above table, the carbon of such contaminant plastic powder appeared as finite carbon content data.

For each of the above samples, the mixed powder was charged into a graphite mold and hot pressed for 60 min at a temperature of 1500° C. and under a pressure of 300 kg/cm² for sintering. As the gas atmosphere, nitrogen gas was used.

From each of the sintered ceramic samples thus prepared, a test specimen of dimensions 3 mm (thickness)×4 mm (width)×40 mm (length) was cut and subjected to the same 3-point bending test as in the foregoing Examples 1 and 2. Table 4 shows the test results. It is noted that the table includes another Sample No. 5 that was prepared by mixing for 24 hr.

TABLE 4

| Sample No. | Pot (mixing time) | Bending strength kg/mm² | Hardness HV kg/mm² |
|---|---|---|---|
| 1 | Alumina (40 hr) | x̄: 121.5<br>σ: 6.93<br>n: 9 | x̄: 1760<br>σ: 34.2<br>n: 10 |
| 2 | Plastic (15 hr) | x̄: 98.5<br>σ: 8.53<br>n: 15 | x̄: 1742<br>σ: 2.9<br>n: 10 |
| 5 | Plastic (24 hr) | x̄: 103.8<br>σ: 12.8<br>n: 16 | x̄: 1758<br>σ: 31.3<br>n: 10 |
| 3 | Plastic (30 hr) | x̄: 92.3<br>σ: 9.08<br>n: 15 | x̄: 1728<br>σ: 33.2<br>n: 10 |
| 4 | Plastic (50 hr) | x̄: 95.4<br>σ: 8.53<br>n: 17 | x̄: 1740<br>σ: 28.5<br>n: 10 |

It is found from the above table that the Sample 1 gave a sintered ceramic of higher strength as compared to other samples. Samples 2, 3, 4 and 5 were contaminated with plastic powder as indicated in Table 3, so that a possible hypothesis is that as this plastic powder decomposed at the sintering temperature, free carbon was producted to react with oxygen and the reaction product which is CO gas formed pores, which lowered the mechanical strength of the sintered ceramic. In the case of the sintered ceramic of Sample 1, such lowering in the mechanical strength did not occur because no free carbon source was present in the sample. For the pores mentioned above, a discussion will be given in Example 4.

EXAMPLE 4

Figure 2:
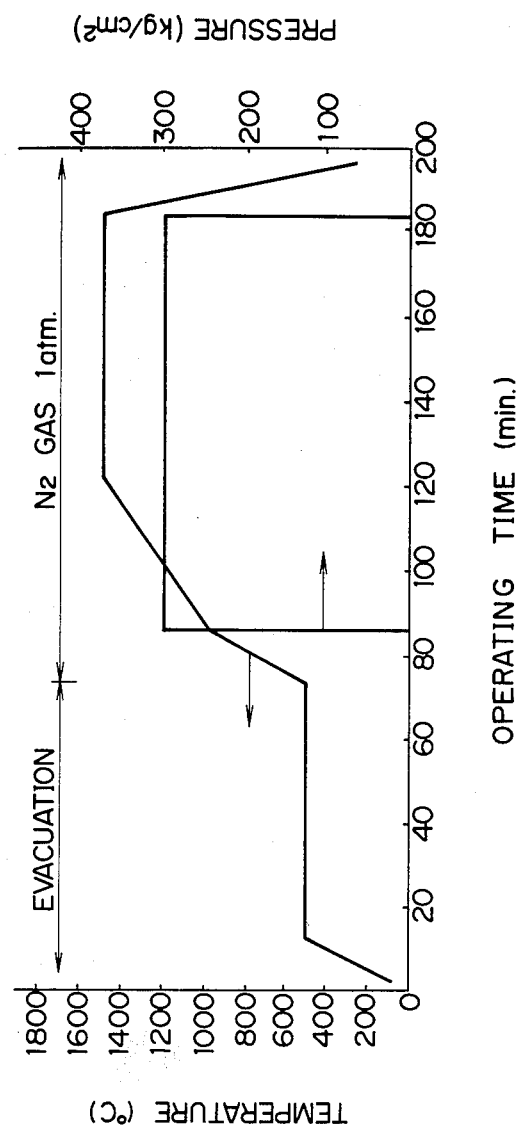
FIG. 2 shows curves representing a temperature and pressure control program for a hot pressing method.
Figure 3:
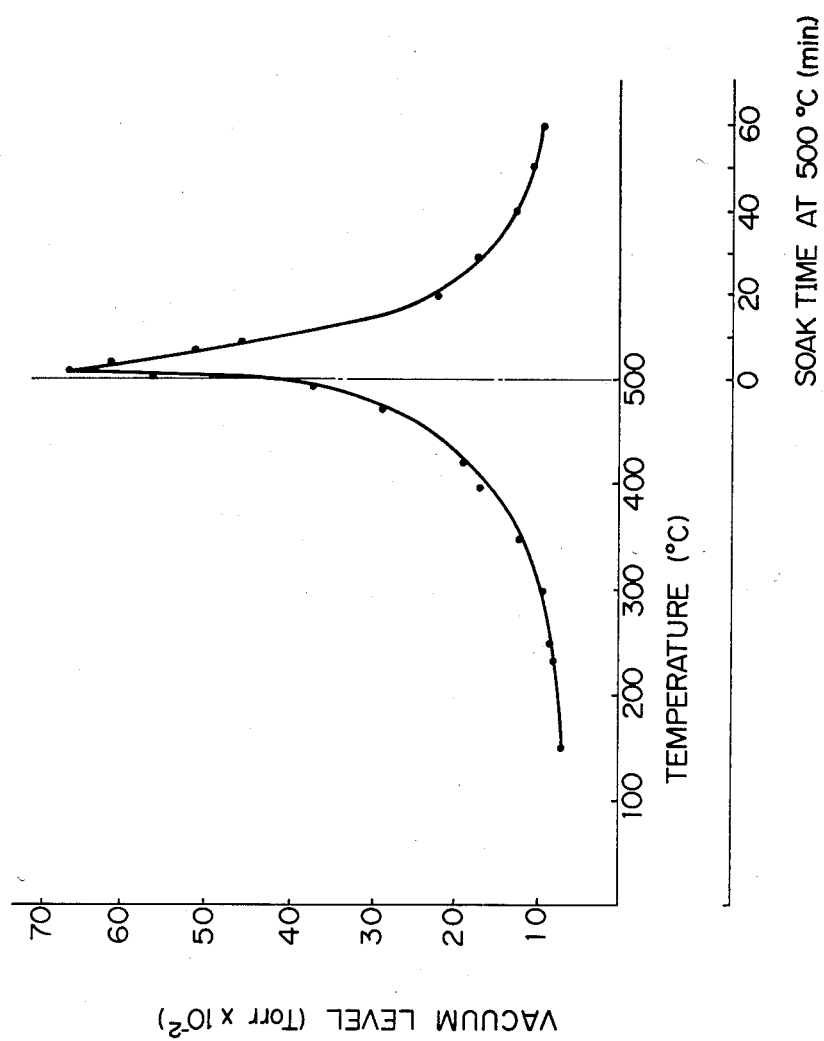
FIG. 3 is a curve showing how the vacuum level in the furnace changed at the evacuation step before sintering when the furnace temperature was first raised up to 500° C. and then kept at this level for a certain period of time.

Mixed powders were prepared by the same procedure as in Example 3 except that the drying step was not thoroughly carried out. Each mixed powder was charged in a graphite mold and sintered according to the temperature and pressure control program shown in FIG. 2. In this program, a rotary pump was used for evacuation of the furnace until the end of a 500° C., 1 hr step. During the course of such evacuation at the pre-sintering step, a Pirani gauge was used to determine the vacuum level. FIG. 3 shows the results. The furnace was then charged with nitrogen gas up to the atmospheric pressure and run for full sintering. It is obvious from FIG. 3 that at 500° C. under reduced pressure some gas was released from the mixed powder to lower the vacuum level. Though it was not determined whether the released gas was the vapor of ethyl alcohol or water, it is clearly understood that the above pumping eliminated gas sources from the mixed powder suppress gas generation that would have given rise to pores in the sintering process.

Test specimens were cut from the sintered ceramic samples thus produced and subjected to the same bending test a made in Examples 1 to 3.

Table 5 shows the results, which indicate a further improvement in bending strength as compared to Example 2 (Table 4).

TABLE 5

| Sample No. | Pot (mixing time) | Bending strength kg/mm² | Hardness HV kg/mm² |
|---|---|---|---|
| 1 | Alumina (40 hr) | x̄: 122.8<br>σ: 7.83<br>n: 18 | x̄: 1743<br>σ: 29.8<br>n: 10 |
| 2 | Plastic (15 hr) | x̄: 99.0<br>σ: 9.06<br>n: 16 | x̄: 1760<br>σ: 31.3<br>n: 10 |
| 5 | Plastic (24 hr) | x̄: 105.6<br>σ: 13.7<br>n: 15 | x̄: 1755<br>σ: 35.2<br>n: 10 |
| 3 | Plastic (30 hr) | x̄: 89.0<br>σ: 6.85<br>n: 20 | x̄: 1728<br>σ: 28.1<br>n: 10 |
| 4 | Plastic (50 hr) | x̄: 103.2<br>σ: 10.4<br>n: 18 | x̄: 1732<br>σ: 25.3<br>n: 10 |

Figure 4:
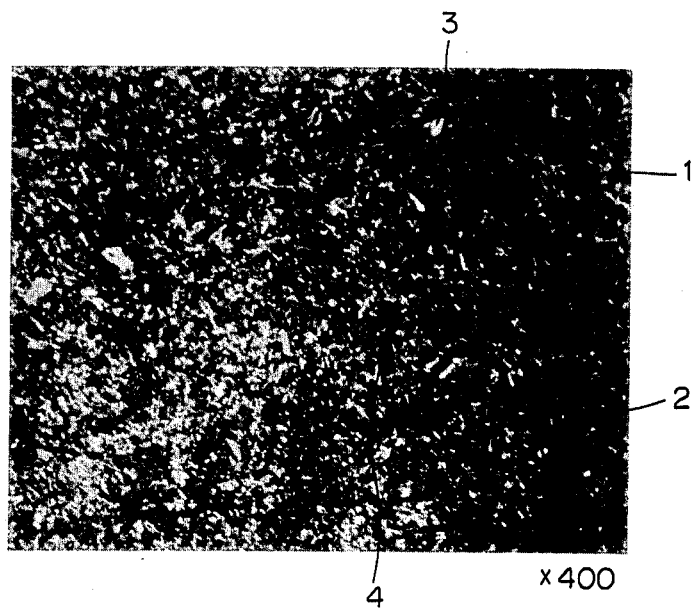
FIG. 4 is a photomicrograph showing the microstructure of a sintered ceramic composite.
Figure 5:
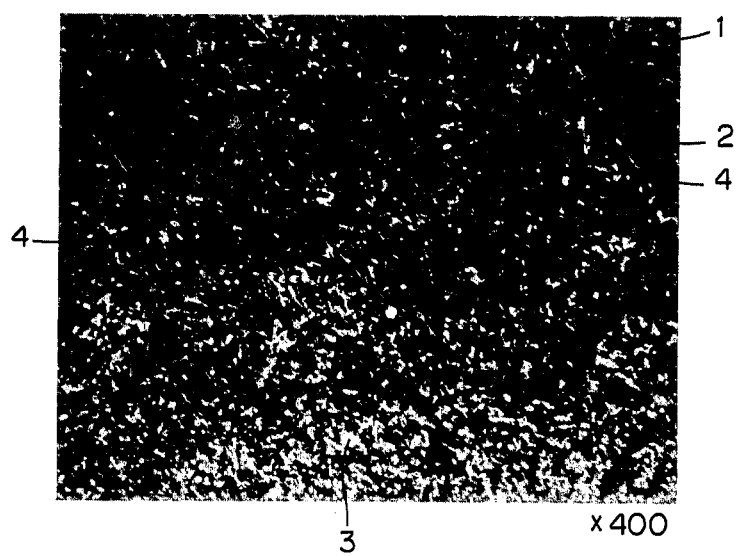
FIG. 5 is a photomicrograph showing the microstructure of another sintered ceramic composite.

FIGS. 4 and 5 are the optical photomicrographs of 400 magnifications showing the microstructure of the sintered ceramic samples 1 and 4, repectively. In these photomicrographs, alumina grains, silicon carbide whiskers and zirconia grains are observed as shown by numbers 1, 2, and 3, respectively.

The sintered ceramic shown in FIG. 5 contained distinctly identifiable pores numbered 4. As already mentioned, these pores were probably formed by CO gas that was produced as free carbon produced from the contaminant fine plastic powder in the mixed powder was oxidized. By contrast, in FIG. 4, the sample embodying the invention presented only the very few pores that unavoidably remained in the process. It could thus be understood that the difference in the pore formation between the above two sintered ceramic samples manifested itself as the observed difference in the mechanical strength between these samples.

Though an alumina pot was used with the sample 1, it is needless to say that a silicon carbide pot, zirconia pot, or one made of two or more materials selected among alumina, silicon carbide and zirconia can be used to attain effects similar to this example.

In view of the results observed with the above examples, sintered alumina-zirconia-silicon carbide composites embodying the invention are expected to exhibit remarkable improvements in performances if used, for example, in cutting tools. Further, unlike the sintered alumina based ceramics of prior art, the sintered ceramic composites of the invention will find applications to tools, such as dies, cutting tips for drills, and rolls for cold rolling process, as well as parts of engine other than the combustion chamber, etc. Thus, wider fields of applications are expected with these ceramics.

It will be evident that various modifications can be made to the described embodiments without departing from the scope of the present invention.

What is claimed is:

1. An alumina-zirconia-silicon carbide sintered ceramic composite having high strength and high hardness, said sintered ceramic composite being prepared from a mixture consisting essentially of 5 to 50 volume percent of partially stabilized zirconia powder of mean particle size between 0.1 and 1.0 μm, 3 to 40 volume percent of silicon carbide whiskers of 1 μm or less in diameter with an aspect rato between 3 and 200, said aspect ratio being the ratio of the length of a whisker to its diameter, the balance of said mixture being substantially alumina powder, wherein the sum of the amounts of zirconia and silicon carbide accounts for 55 volume percent at most of the total powder mixture.

2. An alumina-zirconia-silicon carbide sintered ceramic composite as claimed in claim 1, wherein said partially stabilized zirconia powder contains up to 2 mole percent of yttria for stabilization.

3. An alumina-zirconia-silicon carbide sintered ceramic composite as claimed in claim 2, wherein the volume ratio of alumina, zirconia, and silicon carbide is 70:15:15.

4. An alumina-zirconia-silicon carbide sintered ceramic composite as claimed in claim 2, wherein the volume ratio of alumina, zirconia, and silicon caride is 80:15:5.

5. A process for manufacturing an alumina-zirconia-silicon carbide sintered ceramic composite having high strength and high hardness, said process comprising the steps of preparing a mixture by mixing 5 to 50 volume percent of partially stabilized zirconia powder of mean particle size between 0.1 and 1.0 μm, 3 to 40 volume percent of silicon carbide whiskers of 1 μm or less in diameter with an aspect ratio between 3 and 200, said aspect ratio being the ratio between the length of a whisker and its diameter, the balance of said mixture being substantially alumina powder, wherein the sum of the amounts of zirconia and silicon carbide accounts for 55 volume percent at most of the total mixture; molding the obtained mixture into a molded body, and then sintering the molded body at a temperature between 1400° and 1800° C.

6. A process as claimed in claim 5, wherein said temperature is between 1450° and 1750° C.

7. A process as claimed in claim 5, wherein said mixture is sintered in an argon gas atmosphere at a temperature between 1700° and 1800° C. under atmospheric pressure.

8. A process as claimed in claim 5, wherein said mixture is sintered in a nitrogen gas atmosphere at a temperature between 1400° and 1700° C. under pressure 9. A process as claimed in claim 8, wherein prior to the sintering step, said mixture is placed in a furnace, then the pressure inside the furnace is reduced by pumping while the temperature in the furance is maintained between 400° and 1000° C.

10. A process as claimed in claim 5, wherein said mixture is made on a ball mill that is equipped with a pot made of at least one of the ceramic materials of which said sintered ceramic is composed.

11. A process as claimed in claim 10, wherein said mixture is made on a ball mill equipped with an alumina pot.

* * * * *

REEXAMINATION CERTIFICATE (1962nd)

United States Patent [19]
Inoue et al.

[11] B1 4,746,635
[45] Certificate Issued  Mar. 30, 1993

[54] HIGH STRENGTH AND HIGH HARDNESS ALUMINA-ZIRCONIA-SILICON CARBIDE SINTERED CERAMIC COMPOSITE AND ITS MANUFACTURING PROCESS

[75] Inventors: Sigeo Inoue; Tetsuo Uchiyama, both of Kumayaya; Toshio Hirai, Izumi; Koichi Niihara, Yokosuka, all of Japan

[73] Assignees: Kabushiki Kaisha Riken, Tokyo; Toshio Hirai, Izumi; Koichi Niihara, Yokosuka, all of Japan

Reexamination Request:
No. 90/002,498, Nov. 4, 1991

Reexamination Certificate for:
Patent No.: 4,746,635
Issued: May 24, 1988
Appl. No.: 864,353
Filed: May 19, 1986

[30] Foreign Application Priority Data

May 25, 1985 [JP] Japan ............... 60-112744
Feb. 28, 1986 [JP] Japan ............... 61-43519

[51] Int. Cl.$^5$ ............................................. C04B 35/56
[52] U.S. Cl. ............................. 501/89; 423/327
[58] Field of Search ............ 501/89, 105, 127, 153; 423/327

[56] References Cited
U.S. PATENT DOCUMENTS

| | | | |
|---|---|---|---|
| 2,979,414 | 4/1961 | Ryshkewitch et al. | 501/89 |
| 4,218,253 | 8/1980 | Dworak et al. | 501/87 |
| 4,543,345 | 9/1985 | Wei | 501/95 |
| B1 4,789,277 | 8/1990 | Rhodes et al. | 501/95 |

FOREIGN PATENT DOCUMENTS 0194811 9/1989 European Pat. Off.
3616572 11/1986 Fed. Rep. of Germany.

OTHER PUBLICATIONS

Rhodes, U.S. Application Ser. No. 711,695.
Lange, "Transformation Toughening," *Journal of Material Science*, vol. 17, pp. 225-263 (1982).
Becker and Wei, "Transformation Toughened and Whisker Reinforced Ceramics," *Society of Automotive Engineers*, Proc. 21st Auto. Tech. Dev. Meeting, pp. 201-205, Mar. 1984.
Perry, et al., *Chemical Engineers' Handbook 5th Edition*, Section 8, pp. 25-26 (1973).
Translation of Riken German Brief, Jul. 12, 1990.
Riken Advertisement.

*Primary Examiner*—M. L. Bell

[57] ABSTRACT

An alumina-zirconia-silicon carbide sintered ceramic composite having high strength and high hardness is composed of 5 to 50 volume percent of partially stabilized zirconia powder of mean particle size between 0.1 and 1.0 μm, 3 to 40 volume percent of silicon carbide powder of mean particle size smaller than 1 μm or silicon carbide whiskers of 1 μm or less in diameter with an aspect ratio between 3 and 200 or combination of said silicon carbide powder and said silicon carbide whiskers, the balance being substantially alumina powder, wherein zirconia plus silicon carbide accounts for 55 volume percent at most of the total.

The sintered ceramic composite is manufactured by making a mixed powder composed of 5 to 50 volume percent of partially stabilized zirconia powder of mean particle size between 0.1 to 1.0 μm, 3 to 40 volume percent of silicon carbide powder of mean paricle size smaller than 1 μm or silicon carbide whiskers of 1 μm or less in diameter with an aspect ratio between 3 to 200 or combination of said silicon carbide powder, and said silicon carbide whiskers, the balance being substantially alumina powder, wherein zirconia plus silicon carbide accounts for 55 volume percent at most of the total, and then sintering the molded mixed powder at a temperature between 1400° to 1800° C.

Further, the mixed powder to be molded and sintered is made on a ball mill equipped with a pot made of one or more of the ceramic materials of which such sintered ceramic is composed.

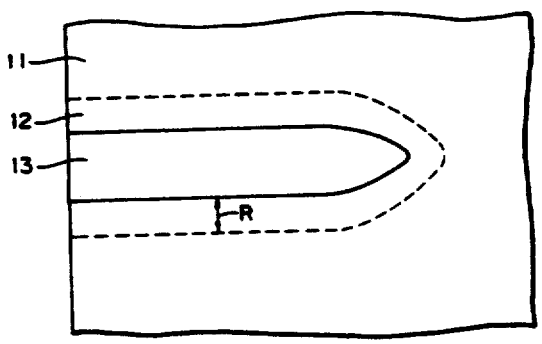

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6-11 are cancelled.

Claims 1, 4 and 5 are determined to be patentable as amended.

Claims 2 and 3, dependent on an amended claim, are determined to be patentable.

New claims 12-18 are added and determined to be patentable.

1. An alumina-zirconia-silicon carbide sintered ceramic composite having high strength and high hardness, said sintered ceramic composite being prepared [from] *by hot-pressing at a temperature between 1400° and 1700° C.* a mixture consisting essentially of 5 to 50 volume percent of partially stabilized zirconia powder of mean particle size between 0.1 and 1.0 μm, 3 to 40 volume percent of silicon carbide whiskers of 1 μm or less in diameter with an aspect ratio between 3 and 200, said aspect ratio being the ratio of the length of a whisker to its diameter, the balance of said mixture being substantially alumina powder, wherein the sum of the amounts of zicronia and silicon carbide *whiskers* accounts for 55 volume percent at most of the total powder mixture.

4. An alumina-zirconia-silicon carbide sintered ceramic composite as claimed in claim 2, wherein the volume ratio of alumina, zirconia, and silicon [caride] *carbide* is 80:15:5.

5. A process for manufacturing an alumina-zirconia-silicon carbide sintered ceramic composite having high bending strength and high hardness, said process comprising the steps of preparing a mixture by mixing 5 to 50 volume percent of partially stabilized zirconia powder of mean particle size between 0.1 and 1.0 μm, 3 to 40 volume percent of silicon carbide whiskers of 1 μm or less in diameter with an aspect ratio between 3 and 200, said aspect ratio being the ratio [between] *of* the length of a whisker [and] *to* its diameter, the balance of said mixture being substantially alumina powder, wherein the sum of the amounts of zirconia and silicon carbide *whiskers* accounts for 55 volume percent at most of the total mixture; molding the obtained mixture into a molded body, and then sintering the molded body *by hot-pressing* at a temperature between 1400° C. and [1800°] *1700°* C.

*12. An alumina-zirconia-silicon carbide sintered ceramic composite as claimed in claim 1, wherein said composite is prepared by hot-pressing at a temperature between about 1450° and 1600° C.*

*13. A process as claimed in claim 5, wherein the molded body is sintered by hot-pressing at a temperature between about 1450° and 1600° C.*

*14. An alumina-zicronia-silicon carbide sintered ceramic composite as claimed in any one of claims 1, 2, 3, 4, and 12, wherein the composite has a bending strength of at least 105.5 kg/mm² and a hardness of at least Hv 1729 kg/mm².*

*15. A process as claimed in claim 5, wherein said partially stabilized zirconia powder contains up to 2 mole percent of yttria for stabilization.*

*16. A process as claimed in claim 15, wherein the volume ratio of alumina, zirconia and silicon carbide is 70:15:15.*

*17. A process as claimed in claim 15, wherein the volume ratio of alumina, zirconia, and silicon carbide is 80:15:5.*

*18. A process as claimed in any one of claims 5, 13, 15, 16, and 17, wherein the resultant alumina-zirconia-silicon carbide sintered ceramic composite has a bending strength of at least 105.5 kg/mm² and a hardness of at least Hv 1729 kg/mm².*

* * * * *